(12) United States Patent
Hartsuiker

(10) Patent No.: US 7,228,245 B2
(45) Date of Patent: Jun. 5, 2007

(54) METHOD FOR DETERMINING THE FUNDAMENTAL OSCILLATION FREQUENCY IN AN OPTICAL FIBER AND AN APPLICATION OF A TENSILE FORCE THUS MEASURED

(75) Inventor: Johannes Antoon Hartsuiker, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 0 days.

(21) Appl. No.: 11/277,802

(22) Filed: Mar. 29, 2006

(65) Prior Publication Data
US 2006/0224270 A1    Oct. 5, 2006

(30) Foreign Application Priority Data
Mar. 30, 2005    (NL) .................................. 1028655

(51) Int. Cl.
*G01R 23/16* (2006.01)
(52) U.S. Cl. ..................................................... 702/77
(58) Field of Classification Search ................... 702/77
See application file for complete search history.

(56) References Cited
U.S. PATENT DOCUMENTS
6,002,472 A * 12/1999 Naka et al. ............... 356/73.1

2004/0129029 A1    7/2004 Naka et al.

* cited by examiner

*Primary Examiner*—John Barlow
*Assistant Examiner*—Cindy D. Khuu
(74) *Attorney, Agent, or Firm*—Sughrue Mion, PLLC

(57) ABSTRACT

A method for determining the fundamental oscillation frequency in an optical fiber during the drawing thereof from an optical preform, the oscillation of the optical fiber being measured perpendicular to the longitudinal axis thereof for the formation of a frequency spectrum using Fast Fourier Transformation (FFT), from which the fundamental oscillation frequency is determined, the method including the following steps:

i) the determination of the frequency spectrum,
ii) the mathematical processing of a number of spectra as determined in step i) to obtain a composite spectrum,
iii) the re-determination of the spectrum,
iv) the removal of the oldest spectrum from the composite spectrum,
v) the mathematical processing of the spectrum according to iv) and the spectrum obtained according to iii) to obtain the composite spectrum,
vi) the determination of the fundamental oscillation spectrum from the composite spectrum,
vii) the repetition of steps iii)–vi).

17 Claims, 2 Drawing Sheets

METHOD FOR DETERMINING THE FUNDAMENTAL OSCILLATION FREQUENCY IN AN OPTICAL FIBER AND AN APPLICATION OF A TENSILE FORCE THUS MEASURED

BACKGROUND OF THE INVENTION

The present invention relates to a method for determining the fundamental oscillation frequency in an optical fibre during the drawing thereof from an optical preform, the oscillation of the optical fibre being measured perpendicular to the longitudinal axis thereof in order to form a frequency spectrum using Fast Fourier Transformation (FFT), from which the fundamental oscillation frequency is determined. The present invention also relates to a specific application of a fundamental oscillation frequency measured using such a method, which fundamental oscillation frequency can be converted into the tensile force.

The method referred to in the introduction is known per se from U.S. Pat. No. 4,692,615, the tensile force in a fibre being determined during the drawing process by determining the fundamental oscillation frequency by means of Fast Fourier Transformation. From this document it is known that the vibration behaviour of an optical fibre during the drawing corresponds to the vibration or oscillation behaviour of a string that is under tension fixed at both ends. According to the method known therefrom it has been found that the transverse movement of an optical fibre during the drawing process can be divided into a number of harmonic partitions whose frequency is related to the tension in the fibre. The harmonic analysis of the transverse vibration movement of the optical fibre is thus used to determine the tensile force, with the drawing rate and the tensile force at a constant furnace temperature being linearly related to one another. The accuracy of the frequency method for monitoring the tensile force was thus further increased by applying a linear regression model to the measured values. However, the tensile force that is determined via such a method proves to show substantial spread in practice, to which it can be added that the fundamental oscillation frequency cannot be accurately determined from the FFT spectrum thus obtained.

A method for determining the fundamental oscillation frequency using FFT is also known from U.S. Pat. No. 5,079,433, according to which an extra check is applied to the second harmonic oscillation frequency. A drawback of such a second harmonic oscillation frequency is that, in practice, it has a peak level that lies several orders below the fundamental oscillation frequency and it is difficult to determine it in the frequency spectrum.

In the manufacture of glass fibres for tele- or data communication a preform is with heating thereof drawn into a glass fibre with a diameter of 125 μm. In this manufacturing step the preform is slowly introduced into a furnace, the preform being heated to around 2000° C. In the furnace the preform melts and is drawn into a glass fibre, which leaves the furnace at the other end. The formed glass fibre is cooled, provided with a protective coating and wound onto a reel. The tensile force with which the fibre is drawn from the hot furnace is an important parameter, which partly determines the strength and optical properties of the fibre.

Before the glass fibre has been provided with a protective coating it is very susceptible to damage. Damage weakens the glass fibre, with the risk of it fracturing, which is undesirable. The concentration of dust in the area through which the unprotected glass fibre passes is therefore reduced by means of known clean-room techniques. Nevertheless, all optical fibres deriving from one preform or large parts of the optical fibre from one preform are sometimes too weak for further processing.

Microscopic analysis of such an optical fibre has shown that this was often caused by minute scratches on the optical fibre. It is believed that this is caused by the unprotected optical fibre touching a component in the drawing tower, or a glass splinter, or a small glass fibre particle, for example in a cooling tube. In spite of precautionary measures such as visual inspection or the cleaning of cooling tubes with brushes prior to the drawing process, weak fibres are sometimes produced.

SUMMARY OF THE INVENTION

One aim of the present invention is hence to provide a method with which the tensile force of an optical fibre can be accurately determined during the production hereof.

Another aim of the present invention is to provide a method that provides information on whether the optical fibre comes into contact with the elements employed in a drawing tower during the drawing process hereof.

Another aim of the present invention is to provide a method that provides information on certain process conditions such as the temperature and/or the drawing rate during the drawing of the optical fibre.

The method as referred to in the introduction is characterised in that the method comprises the following steps:

i) the determination of the frequency spectrum,
ii) the mathematical processing of a number of spectra as determined in step i) to obtain a composite spectrum,
iii) the re-determination of the spectrum,
iv) the removal of the oldest spectrum from the composite spectrum,
v) the mathematical processing of the spectrum according to iv) and the spectrum obtained according to iii) to obtain the composite spectrum,
vi) the determination of the fundamental oscillation frequency from the composite spectrum, and
vii) the optional repetition of steps iii)–vi).

DETAILED DESCRIPTION OF THE EXEMPLARY EMBODIMENTS

Figure 1:
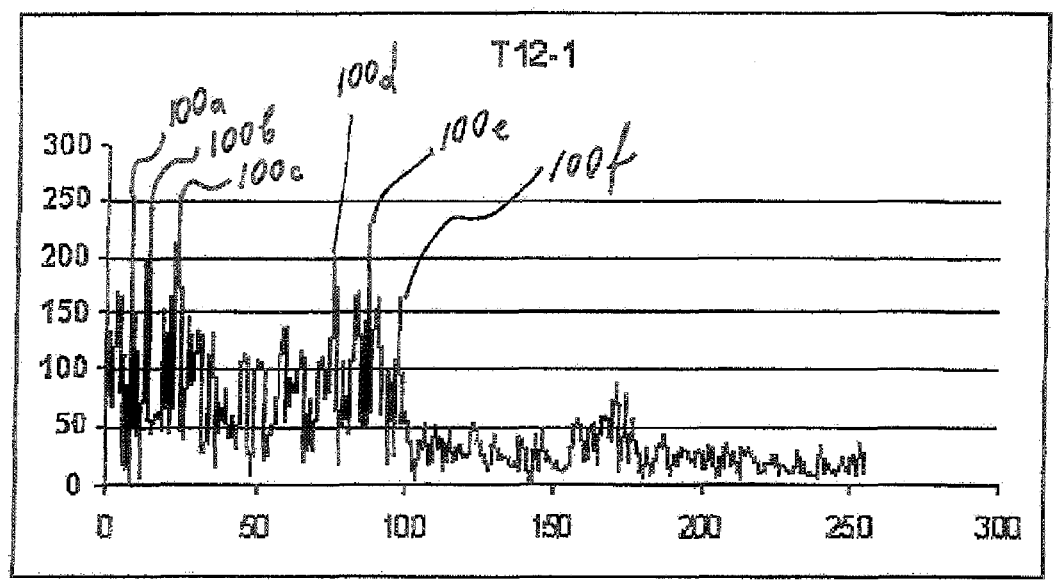
FIGS. 1 and 2 illustrate spectrums of a comparative example in which position and time data of an optical fiber passing through a drawing tower are shown as a function of frequency.

The present inventors have thus developed a method with which it has proved to be possible to determine, on the basis of the "vibrating string method", a reliable value of the fundamental oscillation frequency, or a related parameter, notably the tensile force in the optical fibre, while said optical fibre is being produced. Over a path length L in a drawing tower the optical fibre has a fundamental oscillation that corresponds to the tensile force according to the relation $T=(2.L.f)^2 \cdot \mu$ (T=tensile force, L=free length, f=oscillation frequency, μ=the linear density of the fibre). The tensile force can thus be accurately determined with the aid of the composite spectrum. By constantly removing the oldest measurement from the composite spectrum and supplementing it with a new measurement of the frequency spectrum prevailing at that moment a stable measurement is obtained. According to the present method the oscillation or vibration of the optical fibre is measured perpendicular to the longitudinal axis. A number, many chronologically successive, frequency spectra of this oscillation are determined with the aid of FFT analysis. Next, a number of these frequency spectra are added or multiplied, the result of this mathematical processing being a contrast-rich peak in the frequency spectrum whose position can be determined in a simple manner. This contrast-rich peak, also referred to as the fundamental oscillation frequency, is used in the present invention. The array used for the aforementioned mathematical processing must be continuously supplemented with a new frequency spectrum with the removal of the oldest frequency spectrum, which thus leads to a stable measuring method that can be continuously used during the production of the optical fibres.

In a special embodiment it is desirable for the composite spectrum to be composed of at least 5 separate spectra, in particular for the composite spectrum to be composed of at most 20 separate spectra. By composing the composite spectrum from at least 5 separate spectra a significant suppression of the spread in the contrast-rich peak, in particular a tensile force measurement, is obtained. When such mathematical processing is carried out with more than 20 separate spectra, no appreciable improvement of the spread is observable. It is also possible for the present method to be supplemented by averaging a number of successive results, as a result of which the spread can be even further reduced.

The present inventors have found that when the optical fibre runs into something or touches something during the drawing process this will lead to an absence of the fundamental oscillation frequency in the optical fibre in the measured frequency range. It has also been found that the not continuously running of the optical fibre will in practice lead to a strongly varying pattern of the fundamental oscillation frequency, which oscillation frequency can be determined as outlined above. The fundamental oscillation frequency can be continuously visualised on a monitor during the drawing process, with it also being possible to observe the presence or absence of the fundamental oscillation frequency with the aid of a computer and software, an alarm (audible or visual) being generated in the absence of the fundamental oscillation. In this way an employee can in the absence of the fundamental oscillation frequency during the drawing process check the drawing tower to see whether the fibre is moving freely and optionally stop the drawing process if so desirable. This will make it possible to prevent the production of an optical fibre that does not meet the required specifications.

The tensile force exerted during the drawing of an optical fibre is partly dependent on the temperature in the furnace and the rate at which the fibre is drawn from it. In a furnace with a higher temperature the material of the optical fibre will become softer, and the tensile force will consequently decrease. If a higher drawing rate is used, more tensile force will be exerted on the optical fibre, and the tensile force will become higher. With the method according to the present invention, in which the fundamental oscillation frequency is determined according to an accurate method, it has hence proved possible to adjust the temperature of the drawing furnace and/or the drawing rate.

The present invention also relates to a method for regulating the temperature in a drawing furnace, in which drawing furnace an optical preform is at one end heated, after which an optical fibre is drawn from the end thus heated, according to which the fundamental oscillation frequency, or a related parameter such as the tensile force, determined as outlined above, is used to regulate the temperature of the drawing furnace.

The present invention also relates to a method for adjusting the drawing rate of an optical fibre in a drawing tower, according to which an optical preform is heated at one end in a drawing furnace, after which an optical fibre is drawn from the end thus heated, with the fundamental oscillation frequency, or a related parameter such as the tensile force, as determined in the present method, being used to adjust the drawing rate.

The present invention further relates to a method for checking the passage of the fibre through the drawing tower, with an optical preform being heated at one end in a drawing furnace, after which an optical fibre is drawn from the end thus heated, the fundamental oscillation frequency, or a related parameter such as the tensile force, as determined in the present method, being used to check the free passage of the fibre through the drawing tower.

The present invention also relates to a specific application of the fundamental oscillation frequency, or a related parameter such as the tensile force measured according to the present method, as further described in the appended claims.

The present invention will be further elucidated below with reference to some examples, to which it should however be added that the present invention is in no way restricted to such specific examples.

COMPARATIVE EXAMPLE

Figure 2:
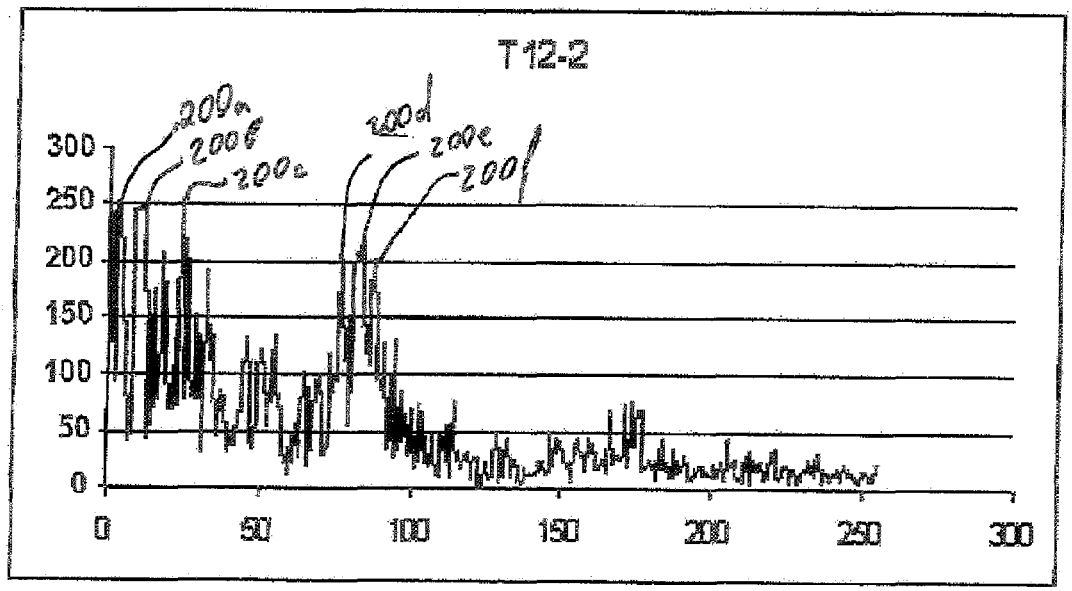

With the aid of a commercially available diameter sensor the position of the optical fibre in a drawing tower is for a specific time measured. In particular, an FFT spectrum is determined from 1024 samples in 5 to 30 seconds. The sensor measures the position of the fibre between the furnace and the coater where the optical fibre is provided with a protective coating. In the path length L between the point at which the optical fibre is formed from the preform in the furnace and the point at which the optical fibre is provided with a protective coating the fibre has a fundamental oscillation that corresponds to the tensile force according to the relation $T=(2.L.f)^2 \cdot \mu$ ($T$=tensile force, $L$=free length, $f$=oscillation frequency, $\mu$=the linear density of the fibre). From these data (position versus time) a frequency spectrum was made with the aid of FFT, which is shown in FIGS. 1 and In both spectra of FIGS. 1 and 2, which figures each represent a different moment in the drawing process, it is difficult to determine the exact peak that corresponds to the fundamental oscillation of the optical fibre. For example in FIG. 1, peaks 100a, 100b, 100c, 100d, 100e, and 100f are provided. Similarly, in FIG. 2, peaks 200a, 200b, 200c, 200d, 200e, and 200f are provided. By using different averaging techniques and the aforementioned relation for the tensile force it is under stable production conditions possible to obtain a measurement of the tensile force with only a standard deviation of approximately 30%, which value is unacceptable in practice.

EXAMPLE

According to the Invention

In the same way as in the comparative example a frequency spectrum of the optical fibre is determined. However, a number of successive spectra are stored and multiplied by one another. By multiplying between 5 and 10 spectra by one another a composite spectrum is obtained in which a distinct peak is observable, as shown in FIG. 3.

Figure 3:
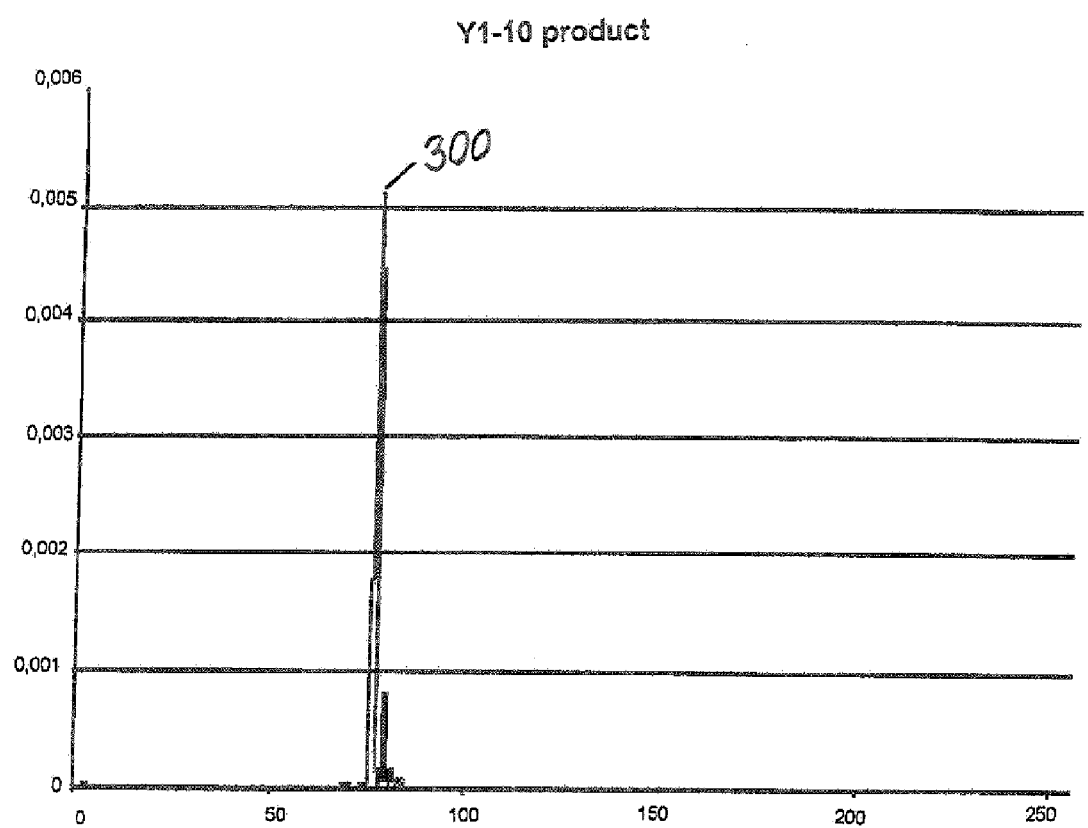
FIG. 3 illustrates a composite frequency spectrum in accordance with an exemplary embodiment of the invention.

By supplementing, during the drawing process of the optical fibre, the spectra that are multiplied by one another with new spectra and removing the oldest spectra a continuous measurement is obtained during the drawing process, represented by means of a composite spectrum according to FIG. 3. The tensile force can be calculated from the position of the clearly observable frequency peak 300 of the multiplied spectra using the usual formula. The measurement of the tensile force under stable production conditions thus obtained has a standard deviation of about 10%, which value is substantially lower than the value obtained in the comparative example.

By averaging the tensile force values thus obtained a number of times, a further reduction in the spread is obtained. Averaging ten times leads to a further reduction in the spread to below 5%.

The invention claimed is:

1. A method for determining fundamental oscillation frequency in an optical fibre during drawing thereof from an optical preform, the oscillation of the optical fibre being measured perpendicular to the longitudinal axis thereof for formation of a frequency spectrum using Fast Fourier Transformation (FFT), from which the fundamental oscillation frequency is determined, wherein the method comprises:
   i) determining the frequency spectrum,
   ii) mathematically processing a number of spectra as determined in operation i) to obtain a composite spectrum,
   iii) re-determining the spectrum,
   iv) removing the oldest spectrum from the composite spectrum,
   v) mathematical processing the spectrum according to the operation iv) and the spectrum obtained according to the operation iii) to obtain the composite spectrum,
   vi) determining the fundamental oscillation frequency from the composite spectrum,
   vii) outputting the determined fundamental oscillation frequency, and
   viii) repeating operations iii)–vii).

2. A method according to claim 1, wherein the mathematical processing as used in the operation ii) and the operation v) comprises the addition or multiplication of spectra.

3. A method according to claim 1, wherein the composite spectrum is composed of at least 5 separate spectra.

4. A method according to claim 1, wherein the composite spectrum is composed of at most 20 separate spectra.

5. A method according to claim 1, further comprising determining tensile force from the fundamental oscillation frequency.

6. A method according to claim 5, wherein the tensile force is determined according to the relation $T=(2.L.f)^2.\mu$ (T=tensile force, L=free length, f=oscillation frequency, $\mu$=the linear density of the fibre).

7. The method of claim 5, further comprises checking the passage of a fibre through a drawing tower in accordance with the tensile force, in said drawing tower, an optical preform is heated at one end in the drawing furnace, after which an optical fibre is drawn from the end thus heated.

8. The method of claim 5, further comprises regulating the temperature of a drawing furnace in accordance with the tensile force, in which drawing furnace an optical fibre is drawn from a heated end of an optical preform.

9. The method of claim 5, further comprises checking the passage of a fibre through the drawing tower in accordance with the tensile force, in said drawing tower, an optical preform is heated at one end in the drawing furnace, after which an optical fibre is drawn from the end thus heated.

10. The method of claim 1 further comprises regulating temperature in a drawing furnace in accordance with the output fundamental oscillation frequency, wherein in said drawing furnace, an optical preform is heated at one end, after which an optical fibre is drawn from the end thus heated.

11. The method of claim 1 further comprises adjusting drawing rate of an optical fibre in a drawing tower in accordance with the output fundamental oscillation frequency, wherein according to the drawing rate, an optical perform is heated at one end in a drawing furnace, after which an optical fibre is drawn from the end thus heated.

12. The method of claim 11, further comprises adjusting the drawing rate of an optical fibre in the drawing tower in accordance with the output fundamental oscillation frequency, an optical preform being heated at one end hereof in the drawing furnace, after which an optical fibre is drawn from the end thus heated.

13. The method of claim 1 further comprises, checking free passage of a fibre through a drawing tower in accordance with the output fundamental oscillation frequency, wherein according to the free passage, an optical perform is heated at one end in a drawing furnace, after which an optical fibre is drawn from the end thus heated.

14. The method of claim 1, further comprises regulating the temperature of a drawing furnace in accordance with the output fundamental oscillation frequency, in which drawing furnace an optical fibre is drawn from a heated end of an optical preform.

15. The method of claim 1, to further comprises adjusting the drawing rate of an optical fibre in a drawing tower in accordance with the output fundamental oscillation frequency, an optical preform being at one end hereof heated in a drawing furnace, after which an optical fibre is drawn from the end thus heated.

16. The method according to claim 1, wherein said outputting comprises displaying on a display or audible outputting the determined fundamental oscillation frequency.

17. The method according to claim 1, wherein said outputting comprises at least one of displaying on a display, outputting to a printer or a database, and audible outputting the determined fundamental oscillation frequency.

* * * * *